United States Patent [19]

Curtil

[11] 4,404,805
[45] Sep. 20, 1983

[54] METHOD OF AND SYSTEM FOR POWER GENERATION BY SUPERCHARGED INTERNAL COMBUSTION ENGINE

[75] Inventor: Rémi Curtil, Montsoult, France

[73] Assignee: Societe d'Etudes de Machines Thermiques S.E.M.T., Saint Denis, France

[21] Appl. No.: 244,624

[22] Filed: Mar. 17, 1981

[30] Foreign Application Priority Data

Mar. 21, 1980 [FR] France .............................. 80 06439

[51] Int. Cl.³ ............................................. F02B 37/00
[52] U.S. Cl. .................................... 60/606; 417/183; 417/407
[58] Field of Search ................. 60/606; 417/159, 183, 417/407

[56] References Cited

U.S. PATENT DOCUMENTS

| 2,172,809 | 9/1939 | Schmitt ................................. 60/606 |
| 2,633,698 | 4/1953 | Nettel .................................... 60/606 |
| 2,898,731 | 8/1959 | Barr ....................................... 60/606 |
| 3,102,381 | 9/1963 | Tryhorn ................................. 60/606 |
| 3,103,780 | 9/1963 | Tryhorn ................................. 60/606 |
| 3,355,877 | 12/1967 | Chaffiotte ............................ 60/606 |
| 3,513,929 | 5/1970 | Kim ...................................... 60/606 |
| 3,775,971 | 12/1973 | Gadefelt .............................. 60/606 |
| 4,215,550 | 8/1980 | Dinger et al. ....................... 60/606 |
| 4,367,626 | 1/1983 | Schwartzman ..................... 60/606 |

FOREIGN PATENT DOCUMENTS

| 801596 | 1/1951 | Fed. Rep. of Germany |
| 1406599 | 6/1965 | France ................................ 60/606 |
| 2226559 | 11/1974 | France . |
| 2024330 | 1/1980 | United Kingdom ................ 60/606 |
| 457813 | 2/1975 | U.S.S.R. .............................. 60/606 |

Primary Examiner—Wendell E. Burns
Attorney, Agent, or Firm—Kenyon & Kenyon

[57] ABSTRACT

An internal combustion engine supercharged with air by an exhaust gas-driven turbo-compressor discharging through a by-pass duct a tapped flow rate of compressed air into the exhaust gas pipe-line feeding the turbine, said tapped flow rate of compressed air being heated by means of a heat exchanger inserted into the by-pass duct and through which are flowing the exhaust gases from the turbine, said tapped flow rate of heated compressed air being injected into the upstream end of the exhaust manifold of the engine.

16 Claims, 10 Drawing Figures

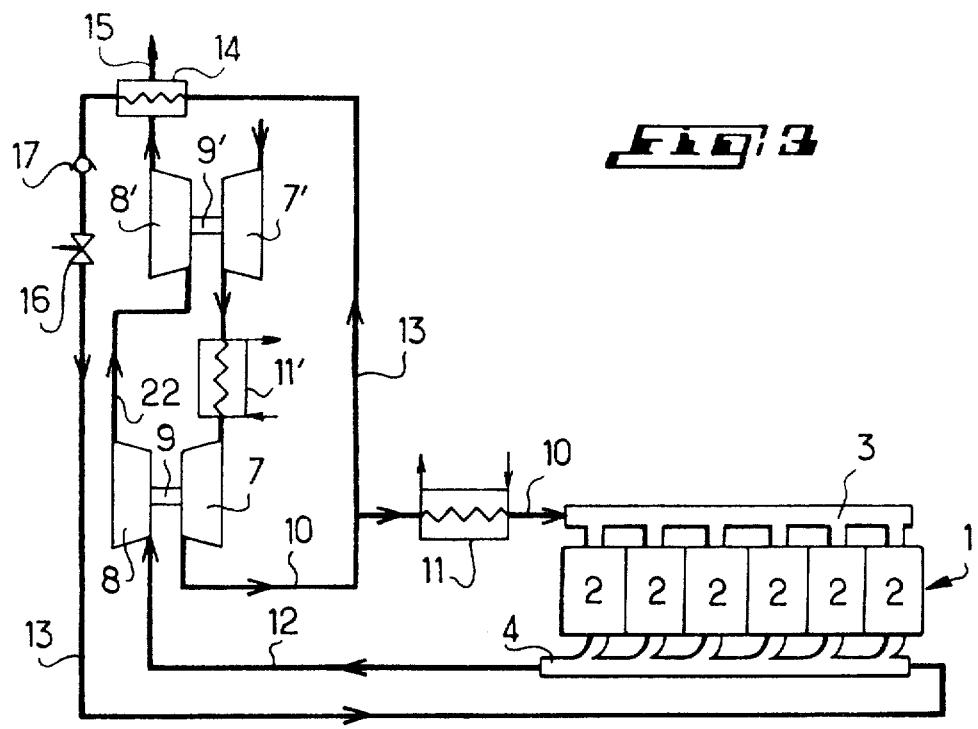
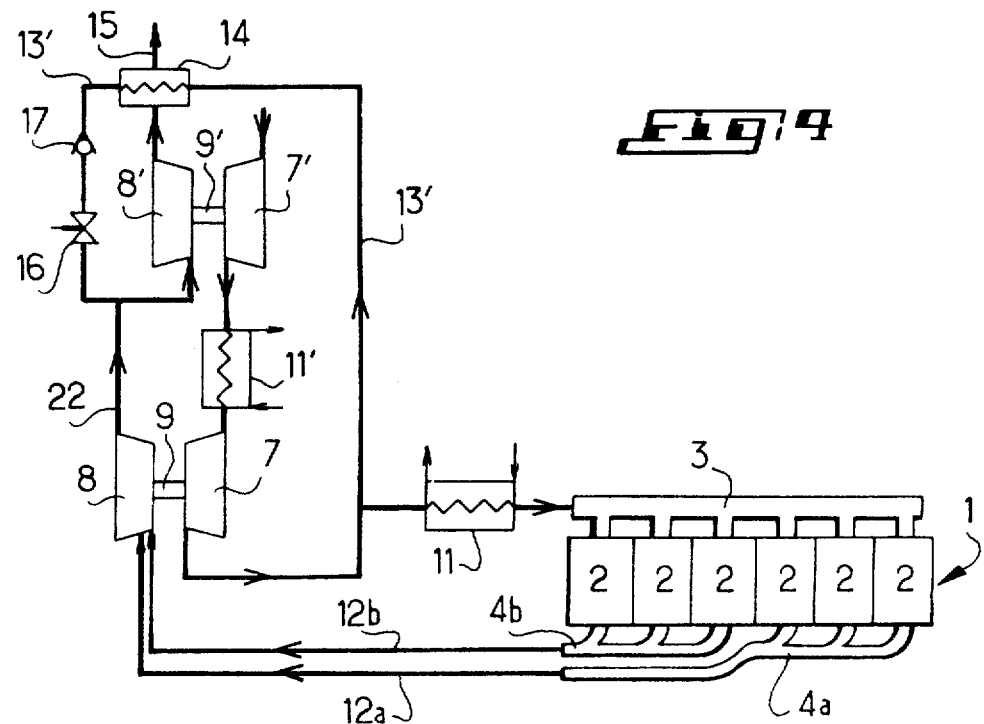

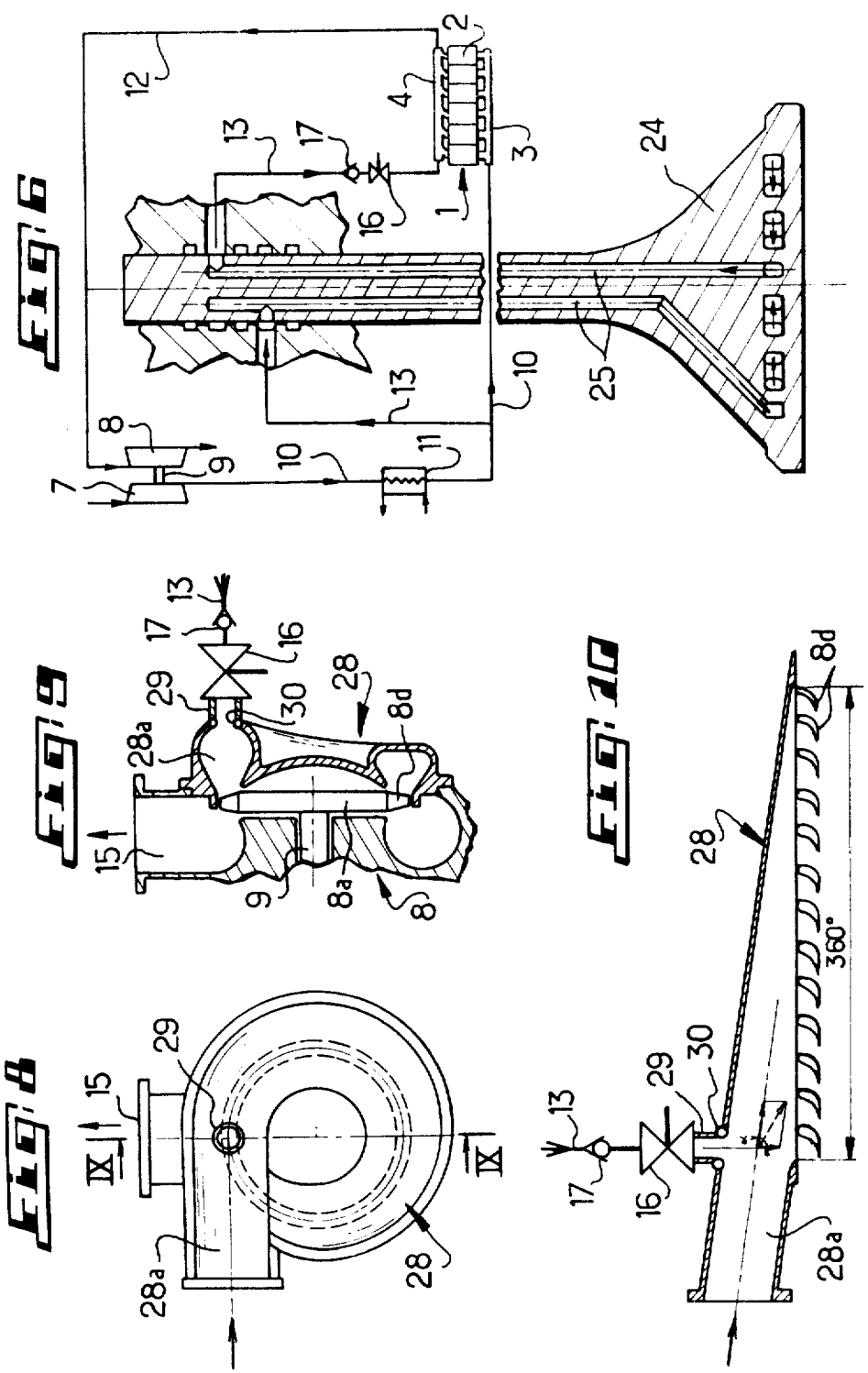

METHOD OF AND SYSTEM FOR POWER GENERATION BY SUPERCHARGED INTERNAL COMBUSTION ENGINE

The present invention relates generally to and has essentially for its object an improved method of producing energy through a power generating device comprising a volumetric (or positive displacement-type) internal combustion drive or motor system with in particular reciprocating pistons such as more specifically but not exclusively a diesel engine; a supercharging air compressor system and a driving turboshaft engine system referred hereinafter to as an exhaust gas-operated turbomotor system with mechanical and/or pneumatic (or fluidic) couplings between these three systems. The invention is also directed to a new power generating system for carrying out said method and it at last aims at the various applications and uses resulting from putting this method and this system into practice as well as at the various assemblies, arrangements or appliances, apparatus, equipments and contrivances or plants provided with such systems.

In the prior state of the art is already known in particular from the French Pat. No. 75.12744 (2, 308, 785), a power generating plant with an internal combustion engine fitted in particular with pistons moving according to a reciprocating straight translatory motion and with compression-induced spontaneous or self-ignition, more specifically such as a four-stroke diesel engine with a small volumetric or compression ratio, supercharged with air by a turbo-compressor having one or several casings or bodies and/or several turbine and/or compression stages with final air cooling downstream of the compressor and possibly intermediate air cooling between successive compression casings or stages, the turbine receiving the exhaust gases from the engine for driving the compressor through the agency of a mechanical coupling shaft. Between the intake and the exhaust of the engine is provided a by-pass duct or pipe-line generally open permanently during engine running and adapted to convey from the compressor to the turbine all the air which has not been absorbed by the engine, which air will meet the exhaust gases issuing from the exhaust manifold of the engine, upstream of the turbine inlet for adding heat to that supplied by the exhaust gases. This heat supply is provided by reheating the air (during operation at low power) by means of a heat recovery through a heat exchanger between at least the major part of and preferably the whole gas flow exiting from the turbine on the one hand and at least that fraction or major part of and preferably the whole air flow issuing from the compressor and streaming towards the engine and the by-pass duct on the other hand. This heat exchanger is thus inserted into the delivery duct of the compressor, the air after-cooler being inserted into the path of travel of the air issuing from the heat exchanger and flowing towards the intake manifold of the engine.

This by-pass duct is thus branched off in parallel relation to the engine and to the air after-cooler (which is cooled through forced circulation either by atmospheric air or by the engine cooling water or liquid). Said heat exchanger is of the kind without mixture of the heating and heated flows, respectively, i.e. having two independent circuits (for instance plate- or tube-type exchanger).

Said by-pass duct is fitted with throttling or restriction means with a gradually variable free passage-way cross section which are automatically controlled to provide between the compressor outlet and the turbine inlet a pressure differential which practically depends only on the pressure prevailing within the by-pass duct. The gases issuing from the heat exchanger will escape or be vented to the outside air. At high powers, the energy, available within the engine exhaust gases, is adequate for driving the turbine. The turbo-compressor is matched with the engine when the latter is running at its rated operating point so that the compressor will then supply in addition to the air flow rate absorbed into the engine an air flow rate which is adapted in particular to keep a definite pressure differential between the compressor outlet and the turbine outlet as well as to cool the hot component parts of the engine through air circulation.

This known arrangement further comprises an auxiliary combustion chamber located upstream of the turbine and receiving the air which has flown through the by-pass duct as well possibly as the engine exhaust gases in order to make the turbo-compressor set self-governing and cause it to operate independently of the engine irrespective of the running speed of the latter and in particular when the engine stands still.

Such a known arrangement suffers in particular from the following inconveniences:

a costly energy expenditure or use because the energy supply to the turbine through heat recovery from the gases issuing therefrom is conveyed in part only to the by-passed compressed air flow rate since the other part is incorporated into the supercharging compressed air fed to the intake manifold of the engine after having flown through the air cooler;

an expensive energy consumption by the auxiliary combustion chamber burning extra fuel;

a structural complexity of the device for feedback control or follow-up operation of the essential component elements (such as in particular the combustion chamber inserted between the exhaust manifold of the engine and the gas inlet to the turbine and receiving the by-passed compressed air flow rate as well as the valve forming the throttling means in the by-pass duct), thereby substantially increasing the overall cost of the plant while substantially reducing its reliability, dependability or safety of operation.

A main object of the invention is to remove or at least to cope with said inconveniences while retaining the main advantages of said known arrangement, in particular namely:

extension of the usable operating range of the engine towards the range of high torques at low running speeds;

possibility of shifting the rated operating point of the air compressor closer towards its hunting limit within the high efficiency zones. For this purpose the invention makes use of a process of the kind consisting as in said known plant in tapping or taking a by-passed compressed air flow between the compressor and volumetric motor systems, respectively, from the total compressed air flow delivered by said compressor system and in adding this by-passed compressed air flow to the exhaust gases of said volumetric motor system between the gas outlet from the working cylinders thereof and before the gas outlet from the turbo-motor system, as well as in feeding an energy supply recovered from the energy conveyed from the gases burnt within the volumetric motor system, to the exhaust gases through the agency of the by-passed compressed air flow.

The invention solves the technical problems set hereinabove by improving this process in that, according to the main or essential characterizing feature of the invention such an energy supply is exclusively provided directly to at least the major part of the by-passed compressed air flow.

In the following description, the following definitions are given for the system concepts previously mentioned:

the volumetric motor system comprises at least one internal combustion engine i.e. it may consist of one or several such engines;

the compressor system comprises at least one compressor and may therefore include one or several compressors;

the turbo-motor or turboshaft engine system comprises at least one exhaust gas-driven turbine and may accordingly consist of one or several of such turbines.

According to the invention and as in said known arrangement the by-passed compressed air flow meets the exhaust gases of the volumetric motor system before the inlet of the turbo-motor system but according to another characterizing feature of the invention this by-passed compressed air flow issuing from at least one compressor of the compressor system and having individually received the energy supply is added to the exhaust gases of at least one internal combustion engine of the volumetric motor system at a point of at least one confined flow passageway for the exhaust gases or of at least one exhaust collecting passage-way of said engine where the instantaneous maximum pressure is low enough to avoid any reversal of the prevailing flow direction of the gas stream and preferably there where the pressure is as constant as possible.

According to an advantageous manner of performing the method according to the invention and as in said known plant, the invention makes use of an energy supply in the form of heat taken from the exhaust gases of the turbo-motor system through air heating thermal exchange between at least the major part of the gas flux issuing from the turbo-motor system and a part of the compressed air flux exiting from the compressor system but according to still another characterizing feature of the invention such a heat exchange is carried out with at least the major part of the by-passed compressed air flow.

In its basic principle used with the basic features stated previously, the invention offers the substantial advantage according to which the more the operating point is closer to the unfavourable operating range (high torques at low speed) where the air pressure delivered by the turbo-motor and compressor systems, respectively, is missing or inadequate, the more the gas temperature at the outlet of the turbo-motor system is higher and therefore the more the potential of recovering energy from the exhaust gases is naturally great. The invention thus makes it possible to simplify to a substantial extent the design of the whole construction and of the feedback control or follow-up system thereof so that substantial savings are achieved thereby.

The invention is also directed to a power generating system for carrying out said method, the system being of the kind comprising: a by-pass duct connecting the compressed air discharge pipe-line of the compressor system to the exhaust gas flow passage-way of the volumetric motor system after their outlet from the working cylinders as well as a device providing on the one hand for an energy recovery from the burnt gases of the volumetric motor system and on the other hand for the transfer of that recovered energy to one part of the compressed air flux, a compressed air flow passage-way extending through this device. This power generating system according to the invention is mainly characterized in that said energy recovery and transfer device is inserted with its compressed air flow passage-way exclusively in the by-pass duct alone.

In that system as well as in said known plant the by-pass duct opens downstream into the exhaust gas flow passageway of the volumetric motor system before the inlet of the turbo-motor system but according to a further characterizing feature of the system according to the invention the by-pass duct branched with its upstream end off the discharge pipe-line of at least one compressor of the compressor system is branched with its downstream end off the exhaust gas flow passage-way of at least one engine of the volumetric motor system, at a point of at least one exhaust gas pipe-line or of at least one exhaust manifold of that engine where the instantaneous maximum pressure is lower than a determined instant limit value.

According to an advantageous embodiment of the system according to the invention the latter comprises as in said known arrangement a compressed air heating thermal exchange system through which is flowing on the one hand at least the major part of the gas flux issuing from the turbo-motor system and on the other hand one part of the compressed air flux exiting from the compressor system but according to another characterizing feature of the invention this heat exchange system comprises at least one heat exchanger inserted exclusively with its compressed air flow passage-way into the by-pass duct.

It should be pointed out that the by-passed compressed air flow rate is insofar necessary (in particular when operating at a high torque and at a low speed of rotation of an internal combustion engine) as the flow rate proper of the gaseous fluid of the internal combustion engine is insufficient because it is too small in relation to the rated or nominal flow rate of the turbine and of the compressor.

The invention will be better understood and further objects, characterizing features, details and advantages thereof will appear more clearly as the following explanatory description proceeds with reference to the accompanying diagrammatic drawings given by way of non-limiting examples only illustrating several presently preferred specific embodiments of the invention and wherein:

FIG. 4 shows another alternative embodiment of the invention in the case of a two-stage supercharging set and of an internal combustion engine with pulse-type exhaust manifolds;

FIG. 5 shows another embodiment of the invention with an internal combustion engine having an exhaust manifold of the kind exhibiting a modular pulse converter integrated into said heat exchanger;

FIG. 6 illustrates still another embodiment of the invention wherein the by-passed compressed air flow is heated up by being used for cooling down at least one hot exhaust valve of the internal combustion engine;

FIGS. 8 to 10 illustrate a particular embodiment of the invention wherein the by-passed compressed air flow is injected into the inlet volute casing of at least one exhaust gas-driven turbine, namely:

FIG. 8 is an outer elevational side view of the volute casing;

FIG. 9 is a fragmentary view in cross section taken upon the line IX—IX of FIG. 8; and FIG. 10 is a view in partial section of the plane expansion or evolution of the volute casing unrolled over 360°.

On the various Figures of the drawings the same reference numerals or characters denote like or similar structural parts or elements.

Figure 1:
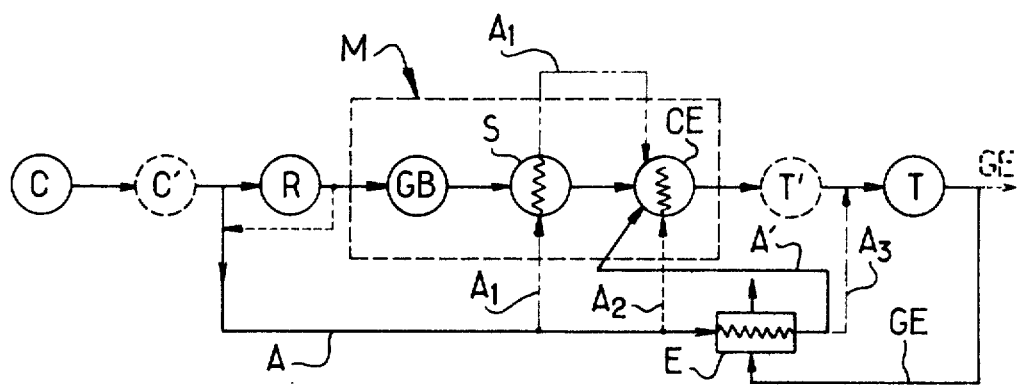
FIG. 1 is a block diagram illustrating most of the cases of application of the invention.

Reference should be had at first to FIG. 1 summarizing by means of an overall block diagram the various cases set forth hereinafter, wherein only the various gaseous fluid circuits or flow passage-ways involved are symbolically shown; the continuous solid lines designate the steady or preferably used gaseous streams whereas the discontinuous broken, dotted or chain-dotted lines designate gaseous streams relating to various other embodiments of the invention. The reference character C denotes the supercharging air compressor which may have one single stage or several for instance two stages C, C' then comprising a low pressure compressor stage C discharging into a high pressure compressor stage C' possibly through an intermediate or inter-stage air cooler not shown. The main compressed air flow, issuing from the compressor, streams through a final air cooler or after-cooler R and enters the internal combustion engine M through the intake manifold thereof, where it is used as a combustion-supporting means for the fuel the combustion of which will produce hot burnt gases GB in the various working cylinders of the engine. These burnt gases will heat up in particular through direct contact the various parts or members of the engine such as in particular the exhaust valves S about which they are streaming by flowing all around thereof when they are exiting from the working cylinders for being collected as exhaust gases within at least one exhaust manifold CE through which they will leave the engine M (depicted in the drawing by a rectangular block or frame in broken lines) for being fed to at least one gas-operated turbine T adapted in some particular cases but not generally to drive an air compressor C. Such a turbine may consist either of one single unit such as T or of several for instance two stages comprising one high pressure stage or turbine T' (symbolically denoted by a circle in broken lines) and a low pressure stage or turbine T.

According to a preferred embodiment the by-passed compressed air flow A taken from the outlet of the compressor C or C' but before the air cooler R will flow through a heat exchanger E wherein it is heated up by the gases GE exiting from the turbine T and also flowing through the heat exchanger E to thereafter escape or be vented to the outside air. The by-passed heated compressed air flow A' is then injected into the exhaust manifold CE for mixing therein with the exhaust gases feeding the turbine. According to an alternative embodiment the heat exchanger E may be substituted for by an ejector through which is flowing one part of the gases GE issuing from the turbine T which would mix therein with the compressed air thereby providing a hot gaseous mixture A' injected into the exhaust manifold CE.

According to another alternative embodiment the by-passed compressed air flow A is taken after the air cooler R and then flows by following the path $A_1$ through at least one hot exhaust valve S of the engine for thereby being heated up while cooling down that valve at the same time and this heated air flux is injected into the exhaust manifold CE.

According to still a further embodiment the by-passed compressed air flow taken before the air cooler R is heated while streaming through $A_2$ about the hot exhaust manifold CE by flowing all around thereof and then this heated air flux is injected into the exhaust manifold.

At last according to still another embodiment usable in the case of a turbine having two stages T and T' the by-passed compressed air flow A taken before the air cooler R will flow through the heat exchanger E where it is heated by the gases issuing from the low pressure turbine stage T and then the air flux thus heated up is injected through $A_3$ into the gases exiting from the high pressure turbine stage T' before the inlet of the low pressure turbine stage T.

These various exemplary embodiments will now be successively described separately hereinafter. In the following Figures all the ancillary devices or apparatus which are not part of the invention and are not necessary to its understanding have been omitted.

Figure 2:
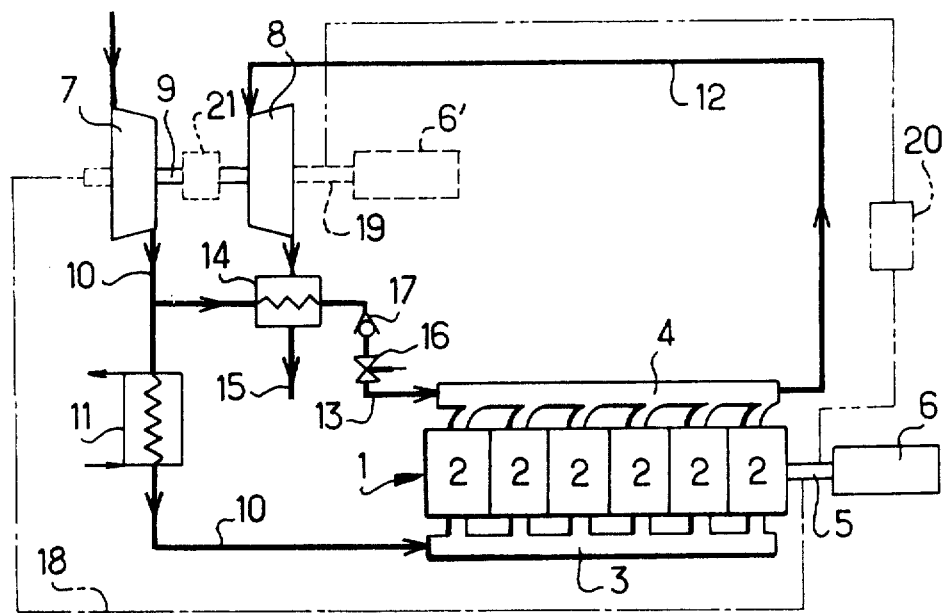
FIG. 2 is an overall view of a power generating system according to the invention showing the basic principle thereof.

The exemplary embodiment shown on FIG. 2 illustrates an internal combustion engine such as a diesel engine 1 with at least one row or bank of working cylinders 2, for instance in a number of 6, arranged in line. The engine could of course include several rows or banks of cylinders, for instance two banks of V-shaped cylinders in which case there should advantageously be provided one supercharging set for each bank of cylinders. The or each row of cylinders of that engine comprises an air intake manifold 3 and at least one exhaust manifold 4 for the burnt gases which in the case of one row of 4 to 10 cylinders will advantageously be one single manifold for each row and of the so-called modular pulse converter type consisting of like duct lengths with a free passage-way cross section which is constant or uniform throughout the whole length of the manifold. Such a kind of manifold has been disclosed in particular to the co-pending U.S. patent application Ser. No. 870,465 and in the continuation-in-part Ser. No. 183,160. Such an exhaust manifold of the modular pulse converter type is rigidly connected directly to the exhaust gas outlet of the engine cylinder head.

The engine yields a useful output power taken off its shaft 5 adapted to drive a receiving or power input utilization apparatus 6 forming the engine load.

The engine 1 forming said volumetric motor system or a part thereof is supercharged by a turbine-driven compressor with one or several stages the air compressor system of which is directly driven mechanically by the turbo-motor system. In the exemplary embodiment shown the air compressor system includes an air compressor 7 and the turbo-motor system comprises a turbine 8 directly operatively connected mechanically to the compressor 7 by a lay shaft 9. The outlet part of the compressor is connected by a delivery duct or pipe-line 10 to the intake manifold 3 of the engine 1 through a final air cooler or after-cooler 11 for the cooling of the engine supercharging compressed air and the flow passage-way of which for the hot fluid to be cooled is mounted in series in that delivery duct. The gas inlet port of the turbine 8 is connected through a pipe-line 12 to the outlet port of the exhaust manifold 4 of the engine. The by-passed compressed air flow is tapped here before the compressed air cooling step by means of a compressed air by-pass duct 13 branched with its upstream end off the discharge duct 10 before the compressed air cooler 11 and with its downstream end off the for instance upstream end of the exhaust manifold 4 so that the heated by-passed compressed air flow be injected into that manifold at the point of lowest instantaneous pressure of the exhaust gases therein. This compressed air recycling location at the upstream end of the exhaust manifold is advantageous because the first engine cylinder may possibly draw fluid in.

A heat exchanger 14 is inserted in series on the one hand with its cold or heated fluid passage-way into the compressed air by-pass duct 13 and on the other hand with its heating fluid passage-way into the gas outlet duct 15 leading from the turbine 8. After the outlet from the heat exchanger 14 this duct 15 opens into the outside air preferably downstream of a silencer or muffler through which it extends.

The by-passed compressed air flow is advantageously adjustable through selective variation in particular so that it may be shut off or stopped when starting the volumetric motor system when it is operating at a power level high enough in order that the output or efficiency of the turbo-motor and compressor systems, respectively, be good. For that purpose the by-pass duct 13 is provided with a valve or the like 16 which may be either of the on-off control type or of the gradual closing and opening type (to provide for a better increase in the by-passed compressed air flow rate with a decreasing running speed of the engine 1). This valve should be closed beyond a certain power level by having for instance its actuation feedback controlled in follow-up relationship by the instantaneous magnitude of the air discharge pressure from the compressor or of the air intake pressure to the engine (since the compressed air pressure at the egress of the compressor is at least approximately proportional to the power output of the engine within a relatively extended range of running speeds).

To avoid any reversal of the direction of flow of the by-passed compressed air flow within the by-pass duct 13 it is necessary that the exhaust gas pressure within the exhaust manifold 4 be lower than the compressed air pressure in the by-pass duct 13 and in order to prevent automatically such a gas stream reversal a check valve or a non-return back-pressure one-way valve is advantageously fitted in the by-pass duct 13 preferably before the valve 16. When the valve 16 is of the on-off control type it should be closed in particular at the start of the engine 1 (i.e. when the intake air pressure is zero) and also when the gas pressure within the exhaust manifold 4 grows higher than the compressed air pressure within the by-pass duct 13 in particular when no check valve or non-return back-pressure one-way valve is provided.

The heat exchanger 14 may be either a stationary or static heat exchanger, of the type fitted with nests, clusters or bundles of coiled or finned tubes, or of the plate-construction type or of the so-called heat pipe type or a revolving regenerative heat exchanger rotated for instance by means of a power take-off from a rotary shaft of the system.

The invention is advantageously applicable to a power generator of the so-called compound type which consists generally of a piston-type internal combustion engine, of at least one air compressor and of at least one gas-driven turbine with the provision of a mechanical coupling between at least two of these three units as well as of a gaseous coupling at least between engine and turbine and between compressor and engine as well possibly as between compressor and turbine. The useful mechanical output power may thus be taken either from the engine shaft or from the turbine shaft or simultaneously from both shafts (in which case the useful output powers recovered from both shafts, respectively, are mutually varying as an inverse function of each other). In the present instance considered of the so-called compound engine forming a gas generator the supercharging air compressor 7 is directly coupled mechanically through a connection 18 (shown in discontinuous broken chain-dotted lines on FIG. 2) to the shaft 5 of the internal combustion engine 1 which then does no longer drive the load 6 directly whereas the turbine 8 is then mechanically separated from the motor-compressor set 1,7 (i.e. it is no longer mechanically coupled operatively to the compressor). In such a case the compressor 7 would absorb all the useful output power from the engine 1 which is conveyed through the agency of the compressed air discharged by the compressor and of the exhaust gases from the engine to the turbine 8 which then operates as one single power transmission or counter-motion and thus drives the utilization apparatus 6' by means of its output shaft 19 possibly through the agency of a speed-reducing gear. Such an arrangement requires a great compression ratio.

In order to avoid this it may be advantageous to absorb one part of the useful output power from the engine 1 through the agency of a preferably hydraulic torque converter 20 connecting the mechanical transmission between the engine and compressor to the mechanical transmission between the turbine and the utilization apparatus. It is thus perhaps possible to combine the application to the compound engine with the embodiment shown for instance in FIG. 2 by in particular providing a disconnectable connection or a disengageable coupling 21 on the shaft 9 between the compressor 7 and the turbine 8.

It should be noted that when it is a turbine which supplies the full useful output power the internal combustion engine may possibly be a free piston-type engine.

Figure 3:
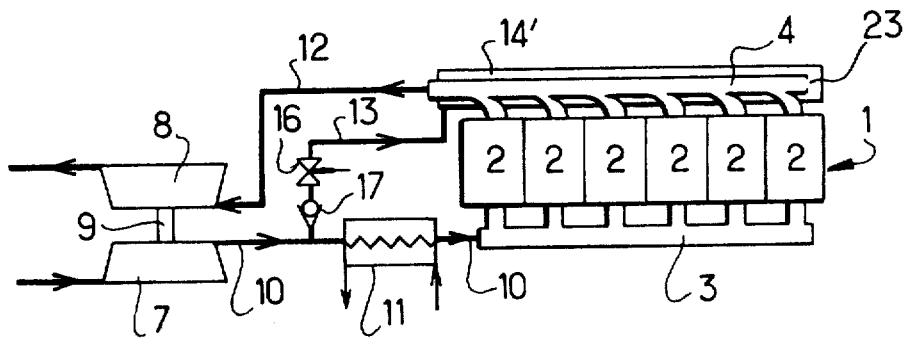
FIG. 3 illustrates an alternative embodiment of the invention in the case of a two-stage supercharging set and of an internal combustion engine with an exhaust manifold of the modular pulse converter type.

Referring to the embodiments shown on FIGS. 3 and 4, respectively, the supercharging of the engine 1 is provided by a turbocompressor system having two stages comprising on the one hand a high pressure turbocompressor consisting of a high pressure compressor 7 directly driven mechanically by means of an intermediate coupling shaft 9 by a high pressure turbine 8 and on the other hand of a low pressure turbocompressor consisting of a low pressure compressor 7' directly driven mechanically through the agency of an intermediate coupling shaft 9' by the low pressure turbine 8'. The first compression stage or low pressure compressor 7' delivers compressed air through an intermediate air cooler or interstage cooler 11' to the second compression stage or high pressure compressor 7 which then discharges the high pressure compressed air to the intake manifold 3 of the engine. The first turbine stage forming a high pressure turbine 8 receives the exhaust gases from the engine and then feeds them into the second turbine stage forming the high pressure turbine 8'.

The by-passed compressed air flow is heated up through heat exchange with at least one part of the gases issuing from the last turbine stage forming the low pressure turbine 8'. For this purpose the heating fluid passage-way of the heat exchanger 14 inserted within the by-pass duct 13 or 13' is mounted in series within the pipe-line 15 leading from the gas outlet port of the last turbine stage forming the low pressure turbine 8'.

The alternative embodiment according to FIG. 3 differs fromm the embodiment according to FIG. 2 only by the provision of a turbine-driven compressor or turbo-blower set with two stages having the particular aforesaid arrangement of heat exchanger 14 in relation to this set.

The alternative embodiment according to FIG. 4 differs from that according to FIG. 3 only in that the or each row of for instance six cylinders 2 of the engine 1 comprises two impulse-type exhaust manifolds 4a, 4b, which are common to two different groups of three working cylinders each, respectively, which manifolds are feeding in parallel relationship through two distinct gas ingresses the first turbine stage forming the high pressure turbine 8. In that case it is preferable that the heated by-passed air flow be not recycled to the exhaust manifolds in view of the high pressure exhaust gas puffs occurring within these exhaust manifolds but it will advantageously be injected between both turbine stages into the gases issuing from the first turbine stage forming the high pressure turbine 8 hence before the inlet port of the second turbine stage forming the low pressure turbine 8'. For that purpose the by-pass duct 13' after the outlet of the heat exchanger 14 is branched with its downstream end off the gas pipe-line 22 connecting both successive turbine stages 8 and 8' to each other.

In all of the foregoing embodiments the valve 16 possibly together with its associated check valve 17 will be advantageously located in the by-pass duct 13 or 13' after the heat exchanger 14 to avoid any clogging or fouling of the compressed air flow passage-way within that exchanger by the exhaust gases from the engine when this valve is closed.

In the embodiment shown on FIG. 5 the by-passed compressed air flow is heated up by the heat taken from at least one part of the exhaust gases collected at the outlet from the volumetric motor system. For that purpose the heat exchanging system comprises at least one heat exchanger inserted respectively with its heating fluid passage-way within at least one exhaust gas flow passage-way at the outlet of the volumetric motor system and with its compressed air flow passage-way within the by-pass duct. In the exemplary embodiment shown the energy supply to the sole by-passed compressed air flow is effected in the form of heat transferred to the latter by at least one portion of at least one exhaust manifold 4 forming a hot component part of the engine 1 which hot part is thus simultaneously cooled down by this circulation of compressed air. The heat exchanger 14' is then mounted about at least one portion or section of the exhaust manifold 4 which accordingly is an integral part of that exchanger while forming the heating fluid passage-way thereof. The heated fluid passage-way (i.e. the by-passed compressed air passage-way) of that heat exchanger 14' then consists for instance of an annular tubular shell or casing surrounding the exhaust manifold 4. For achieving an effective heat exchange the circulation of the heated and heating fluids, respectively, within that heat exchanger 14' will advantageously be carried out in counter-current relationship so that the by-pass duct 13 will lead with its downstream end to the upstream end of the shell or casing 14' (i.e. towards the downstream end of the manifold 4) whereas this casing will communicate through its hot or downstream end preferably with the opposite or upstream end 23 of said manifold.

This embodiment according to FIG. 5 is advantageous or interesting only during the period of transient operating conditions of the internal combustion engine 1.

According to the embodiments shown in FIG. 6, respectively, the energy supply to the sole by-passed compressed air flow is carried out as heat transferred to the latter by at least one for instance movable member of the volumetric motor system so that that hot member is thus simultaneously cooled down by the circulation of compressed air. For that purpose the hot movable member involved comprises a confined compressed air flow passage-way inserted in series within the by-pass duct 13. It is then advantageous that the by-passed compressed air flow be kept after the supercharging compressed air cooling step i.e. that the compressed air by-pass duct 13 be branched off with its upstream end after the compressed air cooler 11.

According to the embodiment shown on FIG. 6 the heat is thus recovered from at least one hot in particular exhaust valve 24 of the volumetric motor system or engine 1. Through that valve extends at least one cooling compressed air flow passage-way 25 mounted in series in the by-pass duct 13 which is advantageously joined with its downstream end to the exhaust manifold 4.

Figure 7:
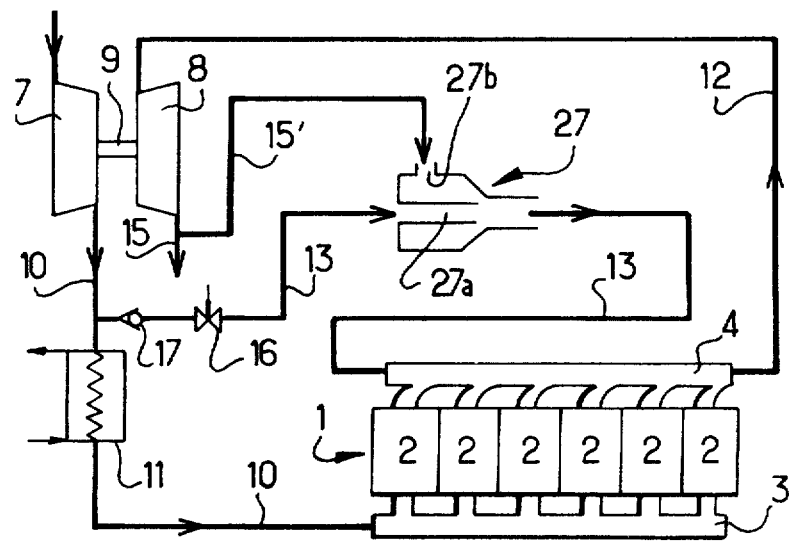
FIG. 7 shows still another embodiment of the invention wherein the by-passed compressed air flow is given a thermal energy and mass supply through mixture within at least one ejector or the like, of one part of the gases issuing from at least one exhaust gas-driven turbine.

According to the exemplary embodiment shown on FIG. 7 the energy supply to the by-passed compressed air flow is performed as heat and mass kinetic energy or momentum through direct mixture with at least the major portion of the by-passed compressed air flow with at least one part of the gas flux exiting from the turbo-motor system in particular through the blast pumping nozzle action drawing in and impelling or moving along said gas by said compressed air acting as at least one air jet. For that purpose there is provided at least one ejector 27 the drive fluid passage-way 27a of which is inserted in series in the compressed air by-pass duct 13 and the impelled fluid suction pipe 27b of which is branched preferably through a by-pass duct 15' off a gas outlet pipe-line 15 leading from the turbine 8. At the outlet of the ejector 27 the mixture of gas and compressed air is fed through the duct 13 preferably to the exhaust manifold 4 of the engine 1 according to the arrangement previously described.

In the foregoing embodiments the turbine is usually of the axial-flow type and its gas inlet casing is generally connected to the exhaust gas inlet duct through a diffuser more particularly in the case of an exhaust manifold of the modular pulse converter type. It is however advantageous in order to obtain a better utilization of the kinetic energy of the gases to maintain the high speed of flow of the gases occurring downstream of the manifold by dispensing with said diffuser and by connecting the outlet of the exhaust manifold or of the exhaust gas inlet pipe-line to the turbine inlet through a volute casing or the like 28 the gas flow passageway cross section of which would decrease gradually from the inlet 28a of the volute casing to the rotor or runner 8a of the turbine 8 as shown in FIGS. 8 to 10 of the drawings. This would imply the omission of the turbine distributor the guiding function of which is provided by the volute casing whereas its accelerating function is accomplished by the exhaust manifold. Such a volute casing has been disclosed in the co-pending U.S. patent application Ser. No. 870,465 of Jan. 18th, 1978. In that last embodiment the connection between the outlet of the exhaust manifold 4 and the axial-flow turbine 8 is accordingly provided by means of a volute-shaped casing 28 for the gas entrance to the turbine which is mounted on the framework or body of the turbine so as to cover or enclose the turbine rotor or runner 8a carrying the radial blades 8d. As already stated this volute casing 28 has such a shape that its free gas flow passageway cross section decreases gradually in order that the velocity of entrance to the turbine rotor or runner 8a of the exhaust gases be constant throughout the whole periphery of that rotor or runner. In the embodiment shown on FIGS. 8 to 10, at least one part of the by-passed compressed air flow which either has received said energy supply and has in particular been heated up or which has not received such an energy supply, is injected under a possibly selectively variable angle α into the volute casing 28 providing a direct connection between at least one exhaust manifold 4 of the volumetric motor system 1 and at least one turbine 8 of the turbo-motor system substantially at the point of tangential connection of the path of travel of the exhaust gases on entering the volute casing with the beginning of their curved path of travel therein so as to induce a deflection of said path of travel through fluidic effect with a view to exert a favourable influence on the triangular diagram of the velocities of entrance to the movable stage or vane of the turbine rotor or runner under a seletively matched and possibly variable angle α, according to the instant operating point of the turbine. The velocity profile of the latter is thus substantially improved thereby further increasing the efficiency of the hot air recycling. For that purpose the by-pass duct 13 (or any other duct for by-passing in particular non-previously heated compressed air) is branched with its downstream end possibly in an angularly adjustable or arbitrarily orientable manner, off the volute casing 28 providing a direct connection of at least one exhaust manifold 4 of the engine 1 with at least one turbine 8, substantially at the point of connection of the straight inlet pipe 28a of the volute casing with the adjacent end of the curved passage-way within that volute casing. Such a branching off may be carried out by means of a pipe or the like 29 for instance pivotally connected in swivelling relationship at 30 to the volute casing 28.

According to the alternative embodiment stated, the by-passed compressed air flow fed into the volute casing 28 may not have received any previous energy supply (in particular through heating), i.e. it may flow directly from the compressor to the volute casing without streaming through any heat recovery apparatus (such as a heat exchanger etc.).

According to another alternative embodiment this bypassed non-heated compressed air flow may consist of a second by-passed flow independent of the by-passed compressed air flow provided with its energy supply (for instance through heating) described in the first instance in all the foregoing embodiments shown on FIGS. 1 to 7 and this alternative embodiment may also be used in combination with the by-passed heated compressed air flow, in which case there will be two by-passed compressed air flows one of which will be heated whereas the other one will not be heated. This second by-passed flow which is not heated may thus be fed to the volute casing 28 through another by-pass duct separated from or independent of the duct 13.

That approach is applicable to all the embodiments previously described and shown.

Furthermore the principles of the invention as set forth hereinabove for the embodiment illustrated in FIGS. 8 to 10 with an axial-flow turbine are transposable in their applications to centripetal-type turbines with a view to exert a favourable influence on the triangular velocity diagram.

It should be understood that the invention is not at all limited to the embodiments described and shown which have been given by way of examples only. In particular it comprises all the means constituting technical equivalents of the means described as well as their combinations if same are carried out according to its gist and used within the scope of the appended claims.

What is claimed is:

1. A method of producing energy with a power generator, comprising: an internal combustion volumetric piston-type motor system, a supercharging air compressor system and an exhaust gas-driven turbo-motor system having mechanical and/or pneumatic couplings therebetween; said method consisting in taking a by-passed compressed air flow between the compressor system and the volumetric motor system from the total compressed air flow discharged by said compressor system and adding said by-passed compressed air flow to the exhaust gases of the motor system between the gas outlets of the working cylinders thereof and before the gas outlet of the turbo-motor system as well as in providing an energy supply recovered from the energy derived from the gases burnt within the volumetric motor system to the exhaust gases through the medium of said by-passed compressed air flow, characterized in that the energy supply to said by-passed compressed air flow is effected in the form of heat and mass momentum through the direct mixture of at least the major part of the by-passed compressed air flow with at least one part of the gas flux issuing from said turbo-motor system, in particular through a pumping blast nozzle effect sucking and impelling said gas by means of said compressed air acting as at least one air jet.

2. A method according to claim 1 in connection with a cooling of the supercharging compressed air of said volumetric motor system, characterized in that said by-passed compressed air flow is tapped before said cooling of said compressed air.

3. A method according to claim 1, wherein at least one part of said by-passed compressed air flow, provided with or devoid of said energy supply is injected under a possibly selectively variable angle into the volute casing forming a direct connection between at least one exhaust manifold of said volumetric motor system and at least one turbine of said turbo-motor system, substantially at the point of tangential connection of the path of travel of the exhaust gases entering said volute casing with the beginning of their curved path of travel therein so as to induce a deflection of said path of travel through fluidic effect.

4. A method according to claim 1, in a volumetric motor system supercharged by a turbocompressor system having at least one stage, the air compressor system of which is directly driven mechanically by said turbo-motor system, characterized in that, in the case of a volumetric engine with at least one row of four to ten working cylinders supercharged by one turbo-compressor for each row and having an exhaust manifold of the modular pulse converter type for each row, the heated by-passed compressed air flow is injected into the exhaust gases of said engine at their point of lowermost instantaneous pressure.

5. A method according to claim 4, wherein in the case of a turbocompressor with at least two stages, said by-passed compressed air flow is heated through heat exchange with at least one part of the gases exiting from the last turbine stage forming a low pressure turbine.

6. A method according to claim 1, for a volumetric motor system supercharged by a turbocompressor system with several stages the air compressor system of which is directly driven mechanically by said turbo-motor system, characterized in that in the case of a volumetric engine with at least one row of six cylinders supercharged by a double-stage turbocompressor for each row the first turbine stage of which forming a high pressure turbine is fed in parallel relationship by two impulse type exhaust manifolds common to two distinct groups of three cylinders each, respectively, said by-passed compressed air flow is heated with at least one part of the gasess issuing from the last turbine stage forming a low pressure turbine and injected into the gases issuing from the first turbine stage forming a high pressure turbine.

7. A method according to claim 1 providing an adjustable by-passed compressed air flow and wherein said by-passed flow is discontinued on the one hand at the start of the volumetric motor system and on the other hand when the exhaust gas pressure becomes higher than that of the by-passed compressed air and at last during its operation at a power level high enough for achieving a good efficiency of the turbo-motor system and of the compressor system.

8. A method according to claim 7, consisting in automatically preventing any reversal of the direction of flow of said by-passed compressed air flow.

9. A power generating system comprising: a piston-type internal combustion volumetric engine system, a supercharging air compressor system and an exhaust gas-driven turbo-motor system with mechanical and/or pneumatic couplings therebetween; a by-pass duct connecting the compressed air delivery pipe-line from said compressor system to the exhaust gas flow passage-way of said volumetric motor system after the outlet thereof from the working cylinders of said engine system and a device for recovering energy from the gases burnt within said volumetric engine system and for transferring the recovered energy to one part of the compressed air flow, a compressed air flow passage-way extending through said device which is inserted with its compressed air flow passage-way exclusively in said sole by-pass duct, characterized in that said energy recovery and transfer device consists of at least one ejector the impelled fluid suction pipe of which is branched in by-passing relationship off a gas outlet pipe-line of said turbo-motor system.

10. A system according to claim 9, including a cooler for the supercharging compressed air of said volumetric engine system, mounted in the delivery pipe-line of said compressor system, wherein said by-pass duct is branched off said delivery pipe-line before said compressed air cooler.

11. A system according to claim 9, wherein said by-pass duct or another independent by-pass duct is branched with its downstream end in a selectively angularly adjustable manner off the volute casing providing a direct connection of at least one exhaust manifold of said volumetric engine system with at least one turbine of said turbo-motor system, substantially at the point of connection of the straight inlet pipe of said volute casing with the adjacent end of the curved passage-way within said volute casing.

12. A system according to claim 9, wherein said compressed air by-pass duct is connected with its downstream end to the upstream end of said exhaust manifold.

13. A system according to claim 9, provided with a double-stage turbocompressor and wherein at least one part of the gases exiting from the last turbine stage forming a lower pressure turbine are flowing through the heating fluid flow passage-way of said ejector.

14. A system according to claim 9, wherein in the case of a volumetric engine system with at least one row of six working cylinders supercharged by a two-stage turbocompressor for each row the first turbine stage of which forming a high pressure turbine comprises two distinct gas inlets connected to two impulse-type exhaust manifolds, respectively, which are common to two different groups of three cylinders each, respectively, said heating fluid flow passage-way of said ejector is inserted in series within the gas outlet pipe of the last turbine stage forming a low pressure turbine whereas the downstream end of said compressed air by-pass duct is branched off the gas pipe connecting both successive turbine stages forming both high and low pressure turbines, respectively.

15. A system according to claim 9, with a compressed air by-pass duct provided with a valve, wherein a check valve is provided in the by-pass duct upstream of said valve.

16. A system according to claim 9, applied to a compound power generator forming a gas generator the supercharging air compressor of which is directly coupled mechanically to the shaft of said internal combustion engine for absorbing at least a great part of its useful output power which is conveyed back to the exhaust gas-driven turbine which is mechanically separated from the motor-compressor set or connected thereto through a hydraulic torque converter.

* * * * *